United States Patent Office 3,312,695
Patented Apr. 4, 1967

3,312,695
ISOPHTHALIC ACID DERIVATIVES
Herbert Mühle, Basel, Switzerland, assignor to Chemische Fabrik Schweizerhall, Basel, Switzerland, a Swiss company
No Drawing. Filed Aug. 24, 1964, Ser. No. 391,775
Claims priority, application Switzerland, Aug. 26, 1963, 10,492/63
16 Claims. (Cl. 260—247.2)

The present application relates to novel compounds having valuable physiological properties and more particularly improved analgetic properties and corresponding to the following general formula

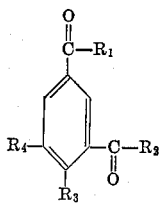

wherein the radicals $R_1$ and $R_2$ are the same or different lower alkoxy radicals or at least one of the radicals $R_1$ and $R_2$ means the group

wherein each of the radicals $R_5$ and $R_6$, which can be the same or different radicals, means hydrogen, alkyl radicals, aryl radicals or aralkyl radicals, or form a heterocyclic ring together with the nitrogen atom, and only one of the two radicals $R_3$ and $R_4$ represents an unsubstituted alkenyl radical or an alkenyl radical substituted by at least one alkyl radical or by at least one phenyl radical, whereas the other of the two radicals $R_3$ and $R_4$ means a hydroxyl group, an alkoxy radical, an alkenyloxy radical or an alkinyloxy radical. Allyl radicals, butylene-2 radicals and the like preferably come in question as alkenyl radical.

These novel compounds are obtained according to the invention by subjecting to a Claisen rearrangement a derivative of 4-hydroxy-isophthalic acid having the general formula

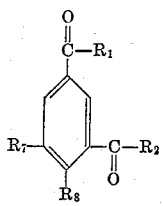

wherein the radicals $R_1$ and $R_2$ have the above meanings and one of the two radicals $R_7$ and $R_8$ is hydrogen whereas the other of the two radicals $R_7$ and $R_8$ means an unsubstituted alkenyloxy radical, preferably an allyloxy, butylene-2-oxy radical, etc., or an alkenyloxy radical substituted by at least one alkyl radical or phenyl radical, preferably an allyloxy, butylene-2-oxy radical, etc., whereupon one can, if desired, etherify the resulting product with a compound yielding an alkyl radical or dialkylaminoalkyl radical.

As starting materials the isophthalic acid dimethyl or diethyl or dibenzyl ester bearing in 4-position a substituted or unsubstituted allyloxy radical will be used for economic reasons. Other dialkyl or diaralkyl esters can naturally also be used with the same success, new valuable compounds being obtained by the said Claisen rearrangement.

Moreover, instead of the esters containing in 4-position a substituted or unsubstituted alkenyloxy radical, e.g. allyloxy radical, the corresponding esters substituted in 5-position may also be used as starting products, and the rearrangement from 5-position to 4-position effected.

Derivatives of isophthalic acid are further suitable as starting materials in which at least one carboxyl group is replaced by a radical of the folowing formula

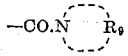

wherein $R_9$ represents a heterocyclic base together with the nitrogen atom. The said heterocyclic radical can hereby, if desired, comprise further hetero atoms, e.g. a second nitrogen atom or an oxygen or sulphur atom, and if desired further substituents, preferably alkyl or alkoxy radicals. Examples of such radicals are the morpholine and piperidine radical, as well as derivatives thereof.

The Claisen rearrangement or transposition of the invention can be effected according to conventional methods, preferably by direct heating to 180-200° C. for example. It can also be performed in the presence of a suitable solvent, such as tetralin or dimethylaniline and the like.

Some examples of suitable starting materials are 4-allyloxy isophthalic acid dimethyl ester, 4-crotyloxy isophthalic acid dimethyl ester, 4-cinnamyloxy isophthalic acid dimethyl ester, 3-carboxy morpholido-4-allyloxy benzoic acid methyl ester, 3-carboxypiperidido-4-crotyloxy-1-benzoic acid methyl ester, and the like.

The present invention further relates to ethers of compounds of the above general Formula I which are obtained by etherifying compounds of the general Formula I in conventional manner.

This additional embodiment of the etherification can be effected by reacting compounds of the above Formula I in the presence of a solvent with a compound yielding an alkyl radical or a dialkylaminoalkyl radical.

The ether formation preferably takes place with an alkyl or alkylene halide in the presence of sodium methylate or of potassium carbonate. One advantageously operates thereby in a suitable solvent, e.g., acetone.

The invention is described in greater detail with reference to the following examples, without however being restricted thereto.

EXAMPLE 1

100 g. of 4-allyloxy isophthalic acid dimethyl ester were heated for 10 hours at 180-200° C. in an oil bath in a 250 cm.³ content round-bottomed flask provided with a reflux cooler. The course of the transposition can be readily followed in a thin layer chromatogram. After 8-10 hours no more starting material can be detected. The resulting transposition product is hereupon distilled in high vacuo for purification and the oil which has solidified to a crystalline mass is recrystallized from petroleum ether. B.P. 130° C., 1 mm. One obtains 81 g. (81% of the theory) of 5-allyl-4-hydroxy-isophthalic acid dimethyl ester having a melting point of 61-63° C.

EXAMPLE 2

50 g. of 4-crotyloxy isophthalic acid dimethyl ester are gradually heated to 180-200° C. in an oil bath in a 100 cm.³ content round-bottomed flask provided with a reflux cooler. After 8-10 hours no more starting material can be detected in a thin layer chromatogram. The heating is interrupted and the transposition product distilled in high vacuo for purification. B.P. 147° C., 0.8 mm. The distilled oil solidifies after a short time to a crystalline mass and is recrystallized from petroleum ether. M.P. 40° C. One obtains 37 g. (74% of the theory) of 5-

(α-methyl-allyl)-4-hydroxy-isophthalic acid dimethyl ester.

EXAMPLE 3

40 g. of 4-cinnamyloxy isophthalic acid dimethyl ester are heated for 8–10 hours to 180–200° C. in an oil bath in a 100 cm.³ content round-bottomed flask. After this time, no more starting material can be detected in a thin layer chromatogram. The content of the flask is dissolved in 150 cm.³ of hot alcohol and discoloured with a small amount of animal charcoal. Crystallization occurs after cooling. One obtains 25 g. (62% of the theory) of 5-(α-phenyl-allyl)-4-hydroxy-isophthalic acid dimethyl ester having a M.P. of 87–88° C.

EXAMPLE 4

50 g. of 4-allyloxy-isophthalic acid dimethyl ester are dissolved in 50 cm.³ of diethylaniline and refluxed for 8–10 hours. After this time no more starting material can be detected in a thin layer chromatogram. The diethylaniline is carefully removed in vacuo, the residue dissolved in ether and washed with 2 N-hydrochloric acid and water. The residue of the ether solution is distilled in vacuo and recrystallized from petroleum ether. One obtains 40 g. (80% of the theory) of 5-allyl-4-hydroxy-isophthalic acid dimethyl ester having a M.P. of 62° C.

EXAMPLE 5

50 g. of 4-crotyloxy-isophthalic acid dimethyl ester are dissolved in 80 cm.³ of tetralin and refluxed for 10 hours. After this time no more starting material can be detected in a thin layer chromatogram. The tetralin is hereupon carefully removed in vacuo and the residue is distilled in high vacuo. After crystallization from petroleum ether one obtains 35 g. (70% of the theory) of 5-(α-methyl-allyl)-4-hydroxy-isophthalic acid dimethyl ester having a M.P. of 40° C.

EXAMPLE 6

10 g. of 3-carboxymorpholido-4-allyloxy benzoic acid methyl ester are gradually heated in an oil bath to 180–200° C. After 10 hours no more starting material can be detected in a thin layer chromatogram. The transposition product is dissolved in 50 cm.³ of alcohol and discoloured with animal charcoal. Crystallization occurs after concentration of the alcohol. One obtains 6.4 g. (64% of the theory) of 3-carboxymorpholido-4-hydroxy-5-allyl-benzoic acid methyl ester having a M.P. of 90–93° C.

EXAMPLE 7

15 g. of 3-carboxypiperidido-4-crotyloxy benzoic acid methyl ester are dissolved in 70 cm.³ of diethyl aniline and refluxed until no more starting material can be detected in a thin layer chromatogram. The diethyl aniline is carefully removed in vacuo and the residue discoloured with a small amount of animal charcoal. After crystallizing from alcohol-water, one obtains 9.8 g. (65% yield) of 3-carboxypiperidido-4-hydroxy-5-(α-methyl-allyl)-benzoic acid methyl ester having a M.P. of 56–58° C.

EXAMPLE 8

10 g. of 5-allyl-4-hydroxy-isophthalic acid dimethyl ester (obtained according to the above Example 1 or Example 4) are introduced into a solution of 0.9 g. of sodium in 50 cm.³ of methanol and the mixture is heated to 60° C. 6 g. of methyl iodide in 10 cm.³ of methanol are allowed to drip in within 30 minutes and the mixture is subsequently refluxed until the solution reacts neutral. The solvent is then carefully removed in vacuo, the residue dissolved in ether, the mixture shaken out 3 times with 2 N-sodium hydroxide solution, hereupon washed first with 2 N-hydrochloric acid and then with water and dried with sodium sulfate. The residue of the concentrated ether solution is distilled in vacuo. B.P.=132° C./1 mm.

EXAMPLE 9

8 g. of anhydrous potassium carbonate is added to a solution of 10 g. of 5-(α-methyl-allyl)-4-hydroxy-isophthalic acid dimethyl ester (obtained according to data in the above Examples 2 or 5) and 8 g. of allyl bromide in 50 cm.³ of acetone, and heated at reflux temperature for 12 hours while stirring. The potassium carbonate is then filtered off, the resulting solution is concentrated, dissolved in ether and shaken out with sodium hydroxide solution. The ether solution is hereupon first washed with 2 N-hydrochloric acid and then with water, and evaporated. The remaining oil is distilled in vacuo. One obtains 7 g. (70% of the theory) of 5-(α-methyl-allyl)-4-allyloxy-isophthalic acid dimethyl ester having a B.P. of 155° C./0.1 mm. After crystallizing from a methanol-water mixture, one obtains needles having a M.P. of 30–32° C.

Further examples of compounds obtainable according to the invention and having the general formula

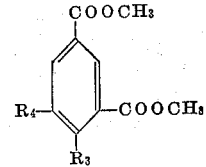

are cited in the following table.

TABLE

| Example | R₃ | R₄ | Yield, percent | M.p. resp. B.p. in ° C. |
|---|---|---|---|---|
| 10 | —OCH₃ | —CH₂—CH=CH₂ | 80 | 132°/1 mm. |
| 11 | —OC₂H₅ | —CH₂—CH=CH₂ | 65 | 158°/1 mm. |
| 12 | —OCH₂—CH₂—CH₃ | —CH₂—CH=CH₂ | 70 | 135°/0.5 mm. |
| 13 | —OCH₂—CH=CH₂ | —OH₂—CH=CH₂ | 55 | 130°/0.3 mm. |
| 14 | —OC₄H₉ | —CH₂—CH=CH₂ | 70 | 150°/0.1 mm. |
| 15 | —OCH₂—C≡CH | —CH₂—CH=CH₂ | 65 | 40°. |
| 16 | —OCH₂—⟨phenyl⟩ | —CH₂—CH=CH₂ | 75 | 34°. |
| 17 | —OCH₂—C≡CH | —CH—CH=CH₂<br>    \|<br>    CH₃ | 70 | 68°. |
| 18 | —OCH₃ | —CH—CH=CH₂<br>    \|<br>    ⟨phenyl⟩ | 45 | 35°. |

Experiments which have been performed with the compounds of the invention have proven their pharmacological superiority compared to known commercial preparations. It was thus determined that, for example, the 4-allyloxy-5-(α-methyl-allyl)-isophthalic acid dimethyl ester (I), which can be prepared according to the data of the above Example 9, is superior to the known trademark product "Pyramidon" (II) with regard to the analgetic efficacy with lower toxicity, as the following values show:

TABLE

| No. | Analgesia | $DL_{50}$ |
|---|---|---|
|  | $ED_{50}$ in mg./kg. | Mouse, mg./kg. |
| I | 26.5 | 650 |
| II | 32 | 250 |

The analgetic efficacy was determined according to the Hol-plate method of Chen and Beckmann (Science, 113, 631, 1951).

What I claim is:
1. A compound of the formula

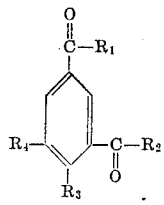

wherein each of $R_1$ and $R_2$ is a member selected from the group consisting of lower alkoxy, morpholino, and piperidino, and one of $R_3$ and $R_4$ is a member selected from the group consisting of unsubstituted lower alkenyl and lower alkenyl substituted by a member selected from the group consisting of lower alkyl and phenyl, and the other $R_3$ and $R_4$ is a member selected from the group consisting of hydroxyl, lower alkoxy, lower alkenyloxy and lower alkinyloxy.

2. 5-allyl-4-hydroxy-isophthalic acid dimethyl ester.
3. 5 - (α - methyl-allyl)-4-hydroxy-isophthalic acid dimethyl ester.
4. 5 - (α - phenyl-allyl)-4-hydroxy-isophthalic acid dimethyl ester.
5. 3 - morpholinocarbonyl - 4 - hydroxy-5-allyl-benzoic acid methyl ester.
6. 3 - piperidinocarbonyl - 4 - hydroxy - 5 - (α - methyl-allyl)-benzoic acid methyl ester.
7. 5-allyl-4-methoxy-isophthalic acid dimethyl ester.
8. 5 - (α - methyl-allyl)-4-allyloxy-isophthalic acid dimethyl ester.
9. 5-allyl-4-ethoxy-isophthalic acid dimethyl ester.
10. 5-allyl-4-propoxy-isophthalic acid dimethyl ester.
11. 5-allyl-4-allyloxy-isophthalic acid dimethyl ester.
12. 5-allyl-4-butoxy-isophthalic acid dimethyl ester.
13. 5-allyl-4-benzyloxy-isophthalic acid dimethyl ester.
14. 5-(α-methyl-allyl)-4-propynyloxy-isophthalic acid dimethyl ester.
15. 5-allyl-4-propynyloxy-isophthalic acid dimethyl ester.
16. 5-(α-phenyl-allyl)-4-methoxy-isophthalic acid dimethyl ester.

No references cited.

ALEX MAZEL, *Primary Examiner.*

J. TOVAR, *Assistant Examiner.*